F. A. TRESTER.
CASTING WEIGHT FOR FISHING.
APPLICATION FILED APR. 13, 1914.
1,201,113.
Patented Oct. 10, 1916.
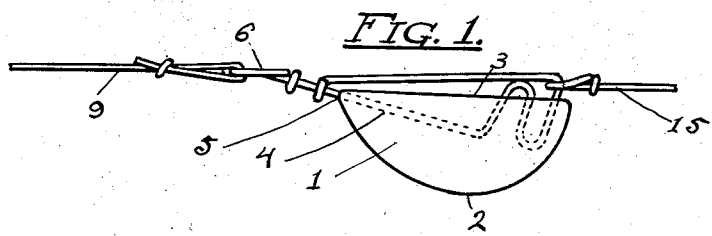
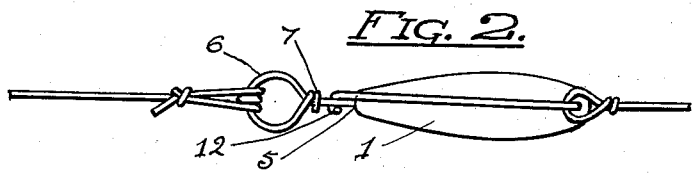
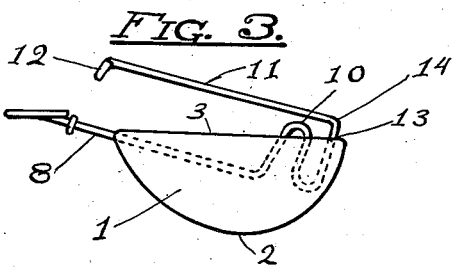
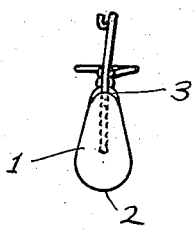
WITNESSES:
INVENTOR
Frederick A. Trester.
BY
ATTORNEY

UNITED STATES PATENT OFFICE.

FREDERICK A. TRESTER, OF KANSAS CITY, MISSOURI.

CASTING-WEIGHT FOR FISHING.

1,201,113.   Specification of Letters Patent.   Patented Oct. 10, 1916.

Application filed April 13, 1914. Serial No. 831,424.

*To all whom it may concern:*

Be it known that I, FREDERICK A. TRESTER, a citizen of the United States, residing at Kansas City, in the county of Jackson and State of Missouri, have invented certain new and useful Improvements in Casting-Weights for Fishing, of which the following is a full, clear, and exact description, such as will enable others skilled in the art to which it appertains to make and use the same.

The invention relates to casting weights for fishing tackle and seeks to provide a simple and effective form of weight to which the line and the lure may be readily attached in a manner that will insure the maintenance of the line, the weight and the lure in their proper relative positions.

Weights are used in casting so that the lure may be cast some distance and sunk, and held in a certain position as the line is reeled in by the fisherman. It is essential that the lure be easily attached to and detached from the weight, and that means be provided on the weight to spread or separate such vegetation and trash as usually exist on the bed of the fishery so that the lure may be maintained in a certain position by the weight.

The attachment of the lure at a certain place on the weight to prevent tangling of the separable parts of the tackle and to hold the lure more nearly in the desired position is also very desirable.

The present invention seeks to provide an improved casting weight for fishing tackle with means on the line connecting end to spread weeds and the like, and means on the opposite end to secure the lure to the weight in a manner that will maintain both the weight and the lure in proper relative positions.

With these and other objects in view, the invention consists in the features of construction, combinations and arrangements of parts hereinafter set forth, illustrated in the accompanying drawings and more fully pointed out in the appended claims.

In the drawings:—Figure 1 is a view in elevation of the improved weight and of the connections of the line and the lure. Fig. 2 is a plan view of the weight showing the connections of the lure and the line. Fig. 3 is a view in elevation of the weight with the lure attachment in open position. Fig. 4 is an end view of the weight with the lure attaching member in open position.

The weight 1 is preferably of lead, circular on the lower side 2 and straight longitudinally on the upper side 3, curved transversely both at the lower and the upper edges, and thicker at the lower than at the upper edges so that the weight will always hang downwardly from gravity, the connections being above the weight.

The spring wire 4 is secured within the weight by casting the weight upon the wire, the latter protrudes at 5 in an angularly upward direction, is formed into a horizontal ring 6, and the end 7 is coiled around the protruding portion 8 of the wire 4. The line 9 by which the weight is drawn in reeling is shown attached to the ring 6 and the ring is maintained in transverse position as shown in Figs. 1 and 2 by the gravity of the weight hanging below the line and lure connections. It will be understood that the ring will separate any weeds or trash between which the line may be drawn so that the position and advance of the weight and lure may not be interfered with.

The wire 4 is an arch at 10 and forms a rest for the section 11 of the wire to rest upon when the hook 12 is secured to the section 8, the wire protruding from the weight 1 at 13 and being bent at an approximately right angle and forming a detachable connection for the ring 15 which is a part of the lure, the lure not being further illustrated because of well known construction.

When the hook 12 is released the section 11 will stand in the position illustrated in Figs. 3 and 4 and the ring 15 may be easily engaged and disengaged, but when the ring 15 is engaged and the hook 12 pressed into the position shown in Figs. 1 and 2 the ring is held in the position as shown in the last named figures, the arch 10 preventing the ring 15 from working over toward the opposite end of the weight 1, and preventing the tangling of the line or lure with the weight.

It is very advantageous to secure the ring 15 of the lure in the fixed position as shown in Figs. 1 and 2 to prevent tangling and to insure the lure to follow the weight in reeling; also the ring 6 in fixed transverse position is very advantageous for the purpose of spreading weeds trash and the like so that the weight and the lure will follow the line in fixed relative positions.

Having described my invention, what I claim as new and desire to secure by Letters Patent, is:—

1. In casting weights for horizontal trailing in fishing, a weight, a wire, a portion of said wire embedded in said weight one end protruding therefrom and forming a ring, a portion of said wire protruding near the opposite end and forming a stop, the opposite end of said wire protruding from said opposite end of said weight forming a bend for fastening a line thereon and extending over said stop to and releasably engageable to said ring end of said wire.

2. In casting weights for fishing, a weight, a wire embedded in said weight, said wire protruding from one end of said weight and having a ring formed thereof, said wire protruding from said weight and forming a loop, said wire projecting from said weight and having a bend therein and a hook formed thereof, said hook arranged to engage and disengage said wire near said ring, said wire being in close proximity to said loop when said hook is engaged and separated therefrom when said hook is disengaged.

3. In casting weights for fishing, a weight, a wire projecting from one end of said weight and a ring formed thereof, a wire loop projecting from near the opposite end of said weight, a wire projecting from said weight between said loop and the end of said weight nearest thereto, said wire paralleling said weight, and said wire having a hook formed thereof and arranged to engage and disengage said first mentioned wire near said ring.

In testimony whereof I affix my signature in the presence of two witnesses.

FREDERICK A. TRESTER.

Witnesses:
CHARLES A. THOMPSON,
JOHN WEILACHER.